United States Patent
Goss et al.

(10) Patent No.: US 9,849,631 B1
(45) Date of Patent: Dec. 26, 2017

(54) THREE DIMENSIONAL (3D) PRINTING BY SELECTIVE ROTATION OF A BUILD PLATFORM

(71) Applicant: Marvell International Ltd., Hamilton (BM)

(72) Inventors: Steven M. Goss, Corvallis, OR (US); Phillip Salvatori, Salem, OR (US); Roger N. Switzer, Vancouver, WA (US)

(73) Assignee: Marvell International Ltd., Hamilton (BM)

( * ) Notice: Subject to any disclaimer, the term of this patent is extended or adjusted under 35 U.S.C. 154(b) by 360 days.

(21) Appl. No.: 14/621,182

(22) Filed: Feb. 12, 2015

Related U.S. Application Data

(60) Provisional application No. 61/940,322, filed on Feb. 14, 2014.

(51) Int. Cl.
  *B33Y 10/00* (2015.01)
  *B33Y 30/00* (2015.01)
  *B29C 67/00* (2017.01)
  *B29L 9/00* (2006.01)

(52) U.S. Cl.
  CPC ....... *B29C 67/0055* (2013.01); *B29L 2009/00* (2013.01); *B33Y 10/00* (2014.12); *B33Y 30/00* (2014.12)

(58) Field of Classification Search
  CPC ... B29C 67/0055; B29C 67/0051; B32B 3/10; B33Y 30/00; B33Y 50/02
  USPC .......................................................... 264/308
  See application file for complete search history.

(56) References Cited

U.S. PATENT DOCUMENTS

| | | | |
|---|---|---|---|
| 2013/0189435 A1* | 7/2013 | Mackie | B29C 67/0055 427/256 |
| 2014/0271964 A1* | 9/2014 | Roberts, IV | B29C 67/0055 425/150 |
| 2015/0251360 A1* | 9/2015 | Steele | B29C 67/0055 264/308 |

\* cited by examiner

*Primary Examiner* — Alison L Hindenlang
*Assistant Examiner* — Yunju Kim

(57) ABSTRACT

Embodiments include an apparatus for fabricating a three-dimensional (3D) object from a digital representation of the 3D object stored in a computer readable media. The apparatus includes a build platform on which the 3D object is to be fabricated and a nozzle configured to deposit printing material on the build platform to fabricate the 3D object. The apparatus further includes a first drive mechanism configured to drive the nozzle over the build platform and a second drive mechanism configured to rotate the build platform.

9 Claims, 9 Drawing Sheets

THREE DIMENSIONAL (3D) PRINTING BY SELECTIVE ROTATION OF A BUILD PLATFORM

CROSS REFERENCE TO RELATED APPLICATIONS

This claims priority to U.S. Provisional Patent Application No. 61/940,322, filed on Feb. 14, 2014, which is incorporated herein by reference in its entirety.

TECHNICAL FIELD

Embodiments of the present disclosure relate to three-dimensional (3D) printing, and in particular to 3D printing by selective rotation of a build platform on which a 3D object is being fabricated.

BACKGROUND

Additive manufacturing technology enables computer designs, such as computer-aided design (CAD) files, to be fabricated into three dimensional (3D) objects. Additive manufacturing, also known as 3D printing, typically comprises depositing, curing, fusing, or otherwise forming a material into sequential cross-sectional layers of the 3D object. The fabrication of a 3D object is achieved using additive processes. Thus, an object is created by laying down successive layers of material until the entire object is created. Each of these layers can be seen as a thinly sliced horizontal cross-section of the eventual object.

In a 3D printer, a nozzle deposits printing material on a build platform to fabricate 3D objects. In a conventional 3D printer, the nozzle can move in the directions of the X axis and the Y axis. Thus, while fabricating a circular or rounded layer of the 3D object, the circular layer is approximated using a plurality of small straight lines, and the nozzle deposits the printing material along each of the plurality of straight lines.

SUMMARY

In various embodiments, the present disclosure provides an apparatus for fabricating a three-dimensional (3D) object from a digital representation of the 3D object stored in a computer readable media, the apparatus comprising: a build platform on which the 3D object is to be fabricated; a nozzle configured to deposit printing material on the build platform to fabricate the 3D object; a first drive mechanism configured to drive the nozzle over the build platform; and a second drive mechanism configured to rotate the build platform.

In various embodiments, the present disclosure also provides a method of fabricating a three-dimensional (3D) object from a digital representation of the 3D object stored in a computer readable media, the method comprising: selectively driving a nozzle over a build platform, wherein the 3D object is being fabricated on the build platform; selectively rotating the build platform; and while one or both of selectively driving the nozzle over the build platform and selectively rotating the build platform, depositing, via the nozzle, printing material to fabricate the 3D object.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
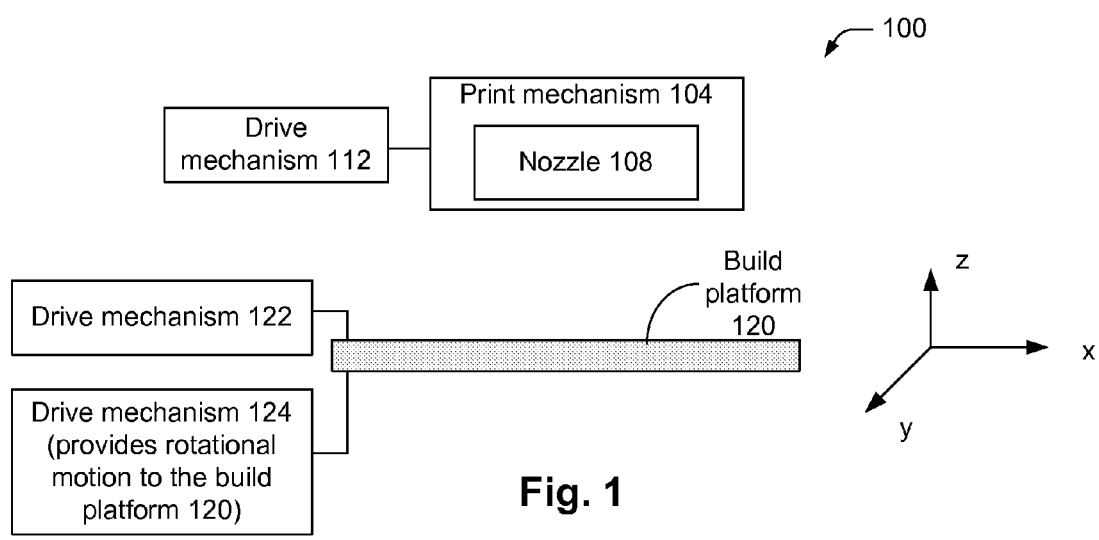
FIG. 1 schematically illustrates a system for fabricating a 3D object from a digital representation of the object stored in a computer readable media, where the system comprises (i) a print mechanism and (ii) a build platform that is configured to selectively rotate while one or more layers of the 3D object is being fabricated on the build platform.

FIG. 1 schematically illustrates a system 100 for fabricating a 3D object from a digital representation of the object stored in a computer readable media, where the system 100 comprises (i) a print mechanism 104 and (ii) a build platform 120 that is configured to selectively rotate while one or more layers of the 3D object is being fabricated on the build platform 120. FIG. 1 schematically illustrates a side view of the build platform 120. The system 100 comprises, for example, a 3D printing system configured to fabricate 3D objects.

The print mechanism 104 (or at least one or more components of the print mechanism 104) is disposed above the build platform 120. In an embodiment, the print mechanism 104 comprises a nozzle 108. Although FIG. 1 illustrates only one nozzle 108, in another embodiment, more than one nozzle can be included in the print mechanism 104. The nozzle 108 is configured to selectively deposit printing material on the build platform 120, to fabricate the 3D object.

For example, the nozzle 108 receives a filament (not illustrated in FIG. 1). A filament is, for example, a tubular or wire-like strip of printing material that is eventually deposited by the nozzle 108 while fabricating the 3D object. A filament comprises any appropriate material used for 3D printing, e.g., polymers, plastic, nylon, etc. For example, the nozzle 108 receives the filament, heats the filament (e.g., using a heating element included in the nozzle 108, or surrounding the nozzle 108, as a result of which the filament at least partially melts), and deposits the at least partially melted printing material of the filament through an opening of the nozzle 108, while fabricating the 3D object.

The system 100 further comprises the build platform 120, on which the 3D object is fabricated, e.g., based on the nozzle 108 depositing the printing material on the build platform 120. As an example, the build platform 120 comprises a build table or a build plate, on which the 3D object is to be fabricated.

FIG. 1 illustrates the X axis, Y axis and Z axis. The X and Y axis are horizontal axis, e.g., are on a plane of the build platform 120 (e.g., assuming that the build platform 120 is also horizontal). The Z axis is the vertical axis, e.g., perpendicular to the plane of the build platform 120. For ease of discussion, directions associated with the X, Y and Z axes are respectively referred to as the x, y and z directions.

In an embodiment, the system 100 further comprises a drive mechanism 112 configured to drive the nozzle 108, while the nozzle 108 is depositing printing material on the build platform 120 while fabricating the 3D object. In an embodiment, the drive mechanism 112 is configured to drive the nozzle 108 in the x and y directions (that is, in the x-y plane). That is, the drive mechanism 112 is configured to drive the nozzle 108 horizontally over the build platform 120.

In an embodiment, the system 100 further comprises drive mechanisms 122 and 124 configured to drive the build platform 120, while the nozzle 108 is depositing printing material on the build platform 120 while fabricating the 3D object. In an embodiment, the drive mechanism 122 is configured to drive the build platform 120 in the z direction. That is, the drive mechanism 122 is configured to drive the build platform 120 vertically.

For example, while the nozzle 108 fabricates a first layer of the 3D object, the nozzle 108 is moved in the horizontal plane over the build platform 120 by the drive mechanism 112. Once the nozzle 108 fabricates the first horizontal layer of the 3D object and is to fabricate a second layer of the 3D object (where, for example, the first layer is at a first horizontal plane, while the second layer is at a second horizontal plane), the drive mechanism 122 adjusts the build platform 120 in the z direction (i.e., adjusts the height of the build platform 120), and then the nozzle 108 fabricates the second layer of the 3D object. The driving of the build platform 120 by the drive mechanism 122 and the driving of the nozzle 108 by the drive mechanism 112 may be continuous and/or overlapping, based on the structure of the 3D object that is being fabricated.

FIG. 1 illustrates the drive mechanism 122 driving the build platform 120 (e.g., driving the build platform 120 in the vertical direction, while the nozzle 108 is being driven in the horizontal plane). However, although not illustrated in FIG. 1, in another embodiment, the drive mechanism 122 may instead drive the nozzle 108 in the vertical direction. In such an embodiment, the nozzle 108 is being driven in the horizontal plane by the drive mechanism 112, and the nozzle 108 is being driven in the vertical direction by the drive mechanism 122 (e.g., while there is no vertical movement of the build platform 120).

In an embodiment, the system 100 further comprises the drive mechanism 124, which is configured to provide a rotational motion to the build platform 120. For example, the drive mechanisms 124 rotates the build platform 120 in the x-y plane (i.e., horizontally rotates the build platform 120).

In an embodiment, the build platform 120 is mounted using a bearing arrangement that allows the rotation of the build platform 120 (or any other appropriate arrangement that allows rotation of the build platform 120). The drive mechanism 124 comprises a motor (not illustrated in FIG. 1). A shaft of motor of the drive mechanism 124 is coupled to the build platform 120 using any appropriate mechanical link. For example, the shaft of motor of the drive mechanism 124 is coupled to the build platform 120 via a gear arrangement, a pulley, a cable or a belt arrangement, a pressure roller, and/or the like. A rotation of the motor of the drive mechanism 124 results in a corresponding rotation in the build platform 120.

In an example, the build platform 120 can rotate in a clockwise direction only. In another example, the build platform 120 can rotate in an anti-clockwise direction only. In yet another example, the build platform 120 can selectively rotate in either the clockwise direction or the anti-clockwise direction, based on the 3D object being fabricated.

Rotation of the build platform 120 is used, for example, while rounded or circular layers of the 3D object is being fabricated, as will be discussed in detail herein later. For example, as will be discussed in further detail herein later, the rotation of the build platform 120 around the axis of rotation allows a 3D part geometry to be described in a cylindrical coordinate system as an alternative to a more common Cartesian coordinate system. An x-y movement (e.g., a movement in the horizontal plane) of the print mechanism 104 by the drive mechanism 112 places the nozzle 108 at a certain radial distance from an axis of rotation of the rotating build platform 120. By this arrangement, the radius component of the cylindrical coordinate system is determined as the radial distance of the nozzle 108 from the axis of rotation of the build platform 120. The rotational drive mechanism 124 provides determination of an angular or theta component of the cylindrical coordinate system. The drive mechanism 122 provides the determination of the Z (or vertical) component of the cylindrical coordinate system.

Figure 2A:
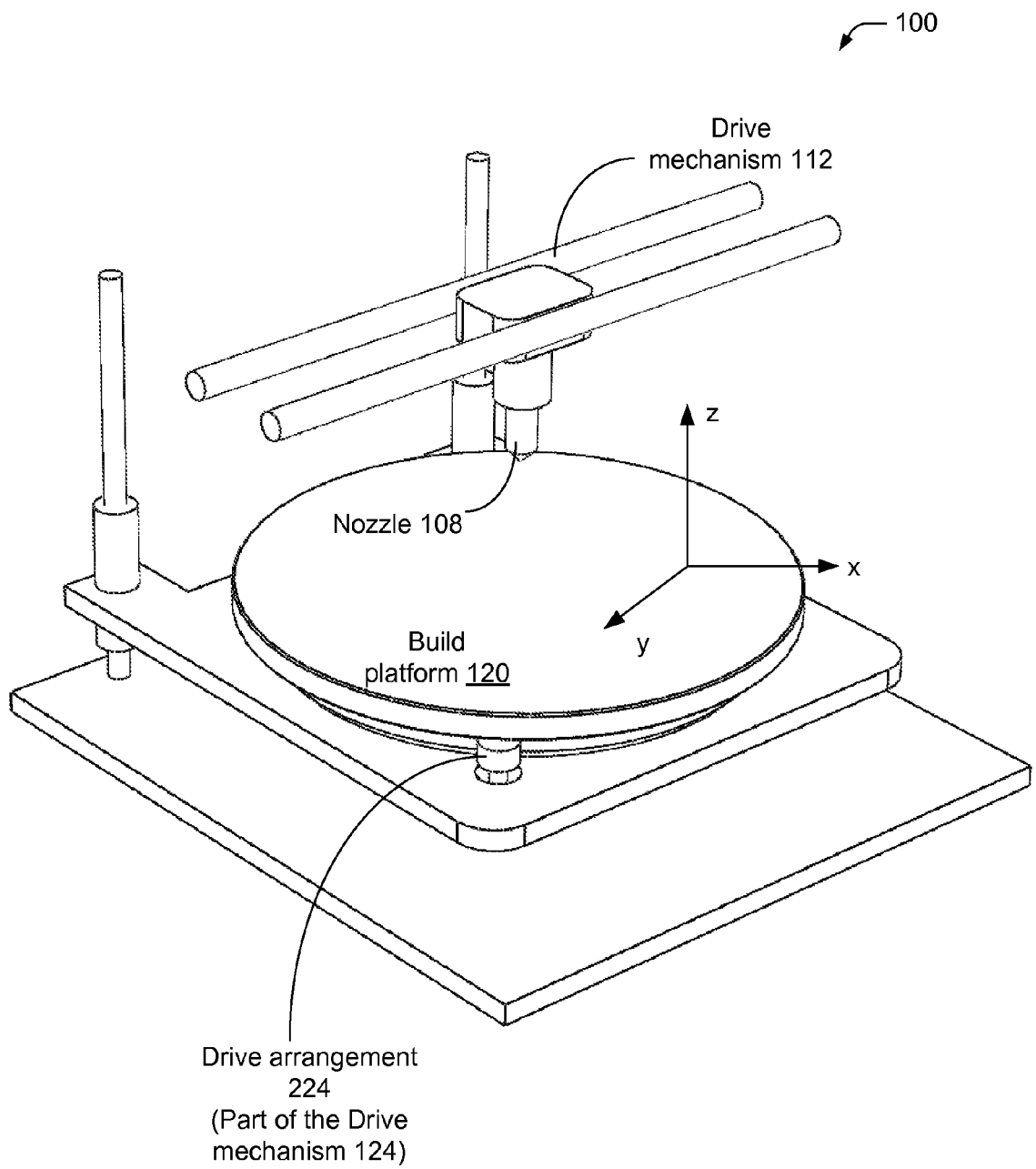
FIGS. 2A-2D illustrate an example implementation of a 3D printing system.
Figure 2B:
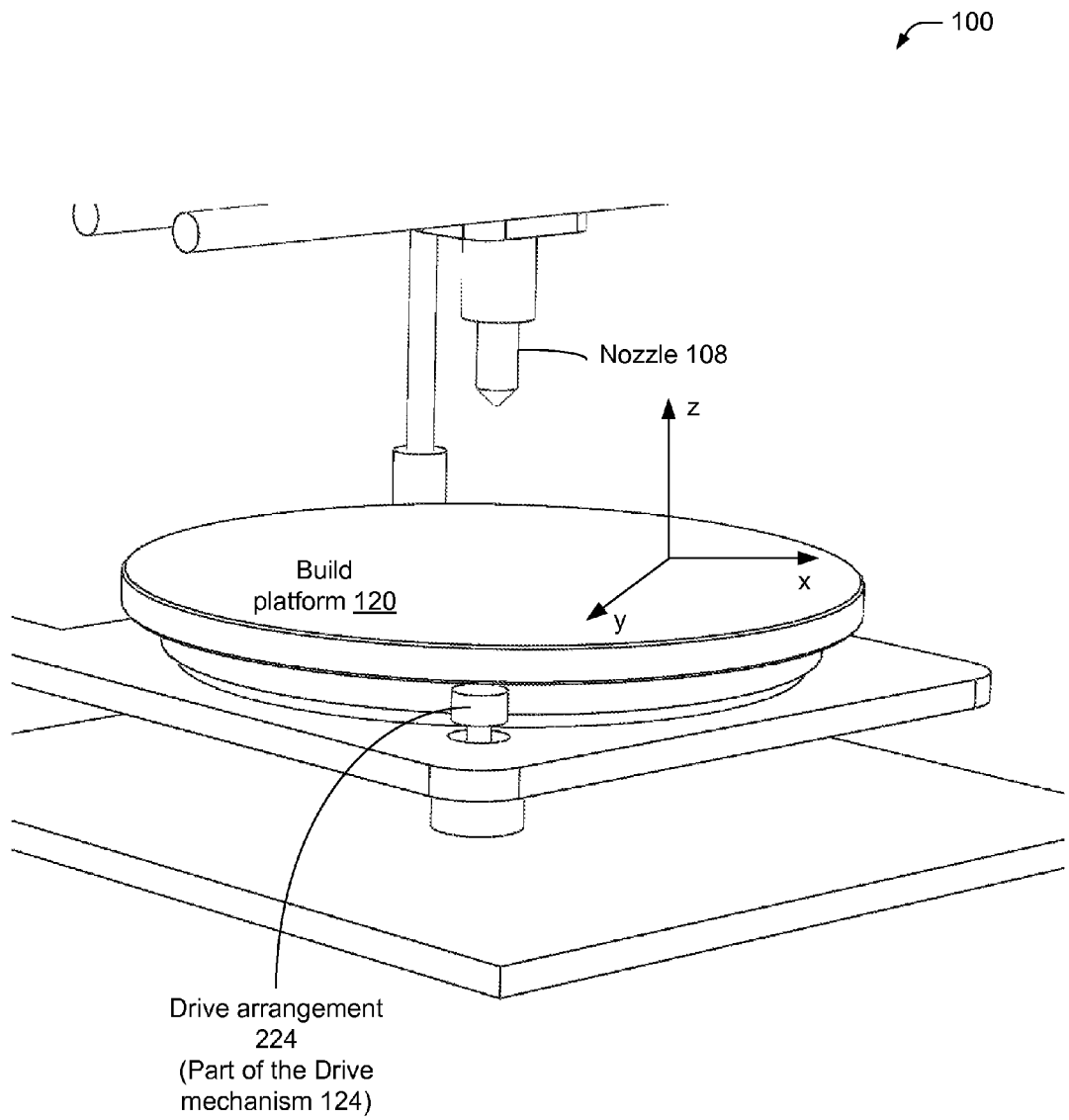
Figure 2C:
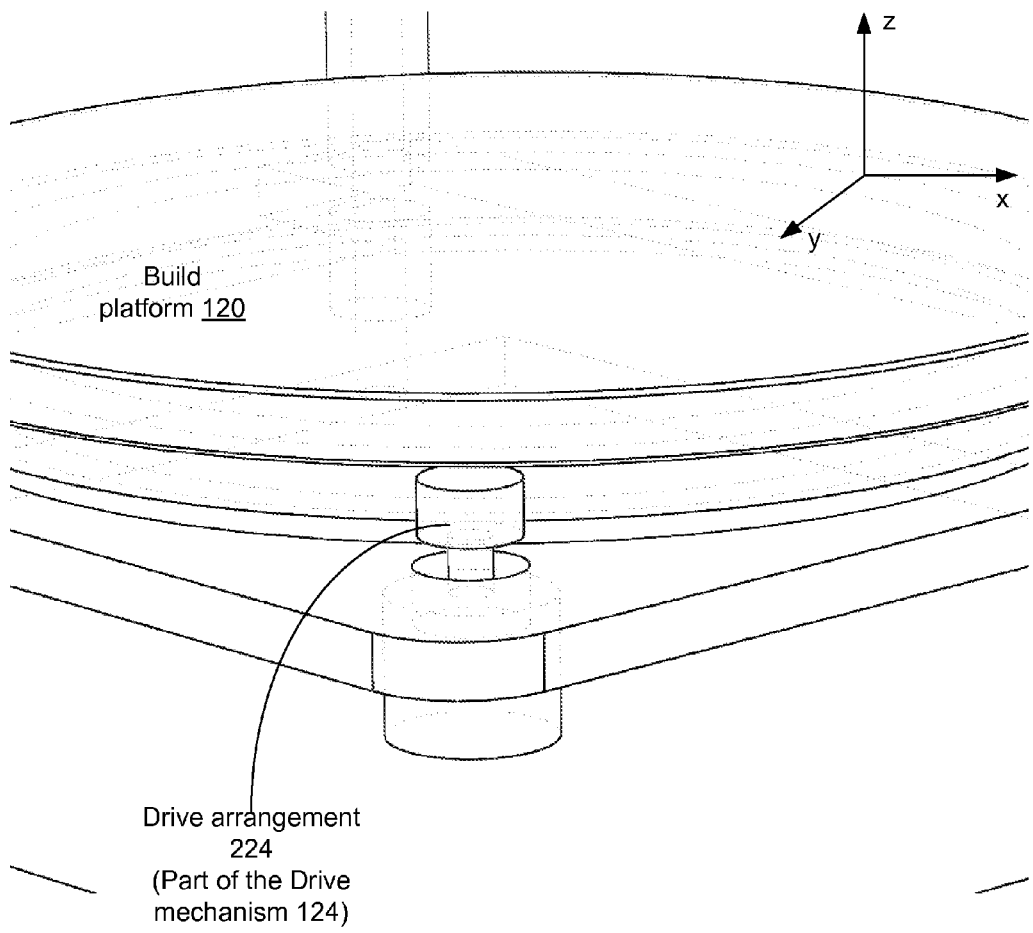
Figure 2D:
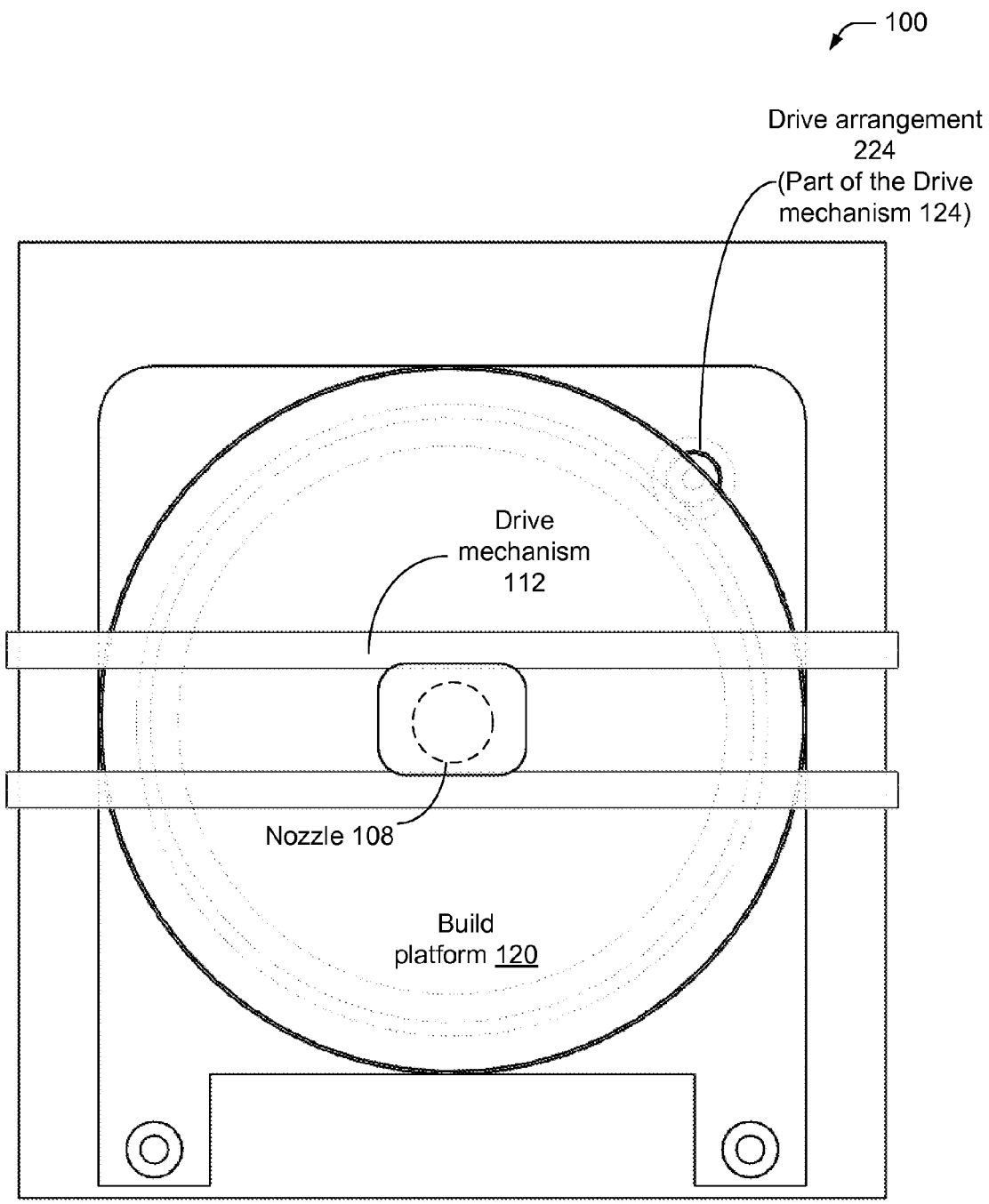

FIGS. 2A-2D illustrate an example implementation of a 3D printing system. For example, FIG. 2 illustrates an example implementation of the system 100 of FIG. 1. Specifically, FIGS. 2A and 2B illustrate side perspective views of the example implementation of the 3D printing system, FIG. 2C illustrates a close-up of the side perspective view of the example implementation of the 3D printing system, and FIG. 2D illustrates a top view of the example implementation of the 3D printing system.

For example, in the implementation of FIGS. 2A-2D, the system 100 comprises the nozzle 108 that is disposed above the build platform 120. The nozzle 108 is driven by the drive mechanism 112 in the x-y plane (i.e., driven horizontally by the drive mechanism 112). The x-y plane movement of the nozzle 108 can determine x, y coordinates in a Cartesian coordinate system and at the same time determine the radial component of a cylindrical coordinate system in which the radius is the distance of the nozzle 108 from the axis of rotation of the build platform 120. FIGS. 2A-2D do not illustrate the drive mechanism 122, which is configured to vertically drive the build platform 120, and which determines the Z component of both Cartesian and cylindrical coordinate systems.

FIGS. 2A-2D also illustrate a drive arrangement 224. In an embodiment, the drive arrangement 224 is in mechanical contact with a side surface on an outer diameter of the build platform 120. When the drive arrangement 224 is rotated, the rotation of the drive arrangement 224 results in a rotation of the build platform 120. The drive arrangement 224 is rotated by any appropriate means, e.g., by a motor that is mounted below the drive arrangement 224 (not illustrated in the figures), by a motor that is mechanically coupled to the drive arrangement 224 via a mechanical link such as a shaft, a gear arrangement, a pulley arrangement, a chain link, a belt drive, etc.

In an embodiment, the drive mechanism 124 of FIG. 1 comprises the drive arrangement 224 and the motor driving the drive arrangement 224.

In an embodiment, the drive arrangement 224 can be any appropriate mechanical arrangement that rotates the build platform 120. In an example, the drive arrangement 224 comprises a pressure roller that presses the side surface on the outer diameter of the build platform 120. When the drive arrangement 224 rotates, the build platform 120 is rotated, e.g., due to the friction and/or the pressure between the drive arrangement 224 and the side surface on the outer diameter of the build platform 120.

In another example, the drive arrangement 224 comprises a gear drive that is engaged to a toothed ring on the side surface of the outer diameter of the build platform 120. When the drive arrangement 224 rotates, the build platform 120 is rotated, e.g., due to the gear arrangement in the drive arrangement 224.

In another example, the drive arrangement 224 comprises any other appropriate type of mechanical arrangement (e.g., comprising belts, chains, pulleys, etc.) that can translate a rotational motion of a shaft of a motor to a rotational motion of the build platform 120.

In another embodiment and although not illustrated in FIGS. 2A-2D, instead of (or in addition to) the drive arrangement 224, the system 100 can have a shaft of a motor mechanically coupled to a shaft of the build platform 120, thereby allowing the motor to rotate the build platform 120.

Figure 3A:
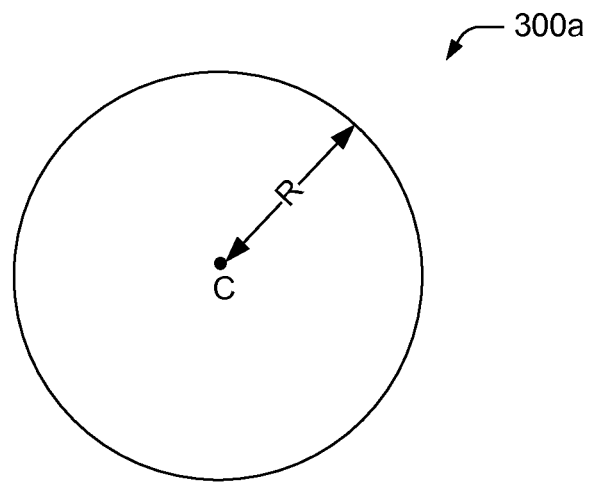
FIGS. 3A and 3B illustrate two example cross sectional layers of a 3D object being fabricated.
Figure 3B:
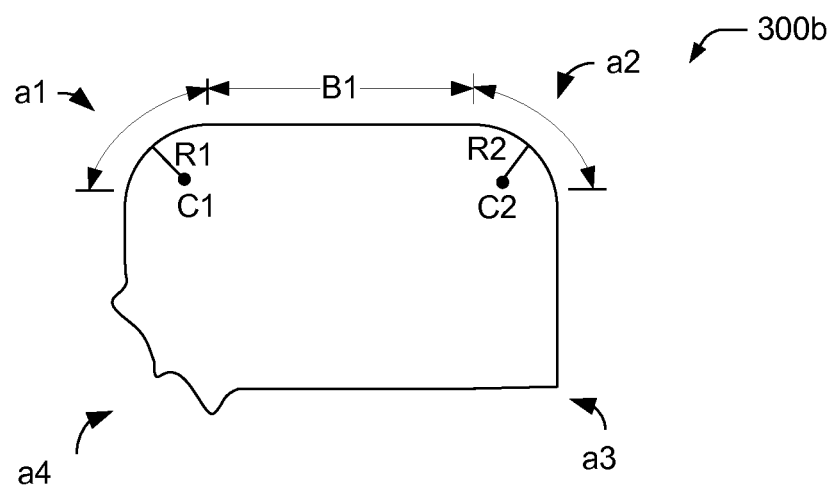

As previously discussed herein, the 3D object is fabricated by the system 100 by, for example, fabricating a plurality of sequential cross-sectional layers of the 3D object. FIGS. 3A and 3B illustrate two example cross sectional layers 300a and 300b, respectively, of the 3D object being fabricated by the system 100. The layer 300a is substantially circular in shape; while the layer 300b is roughly rectangular shaped with two rounded corners, one sharp edged corner, and one corner having an irregular shape.

In a conventional 3D printer (e.g., in which the build platform is not rotated), the layer 300a is fabricated by appropriately moving the nozzle of the conventional 3D printer. For example, in the conventional 3D printer, the layer 300a is approximated using a plurality of small straight lines, and the nozzle deposits the printing material along each of the plurality of straight lines. Approximating the layer 300a using a plurality of small straight lines requires that a database (e.g., which stores the design of the 3D object to be fabricated) store details of each of these straight lines, thereby leading to a relatively large database and a relatively complex design. Furthermore, the nozzle has to continuously change directions, and frequently and rapidly accelerate and decelerate while fabricating the plurality of small straight lines, which lead to a relatively long time required for fabricating, relatively less accuracy in the layer 300a being fabricated, pressure on the drive mechanism driving the nozzle, and/or the like.

In contrast, in an embodiment, in the system 100 of FIG. 1, the circular layer 300a is fabricated based on a rotation of the build platform 120. For example, the circular layer 300a has a center point C and a radius R. To fabricate the layer 300a, the build platform 120 is rotated about the center point C (i.e., the pivot point of the rotation of the build platform 120 is substantially aligned with the center point C of the layer 300a to be fabricated). The nozzle 108 is positioned stationary at a distance R from the center point C of the layer 300a to be fabricated. While the nozzle 108 is stationary and the build platform 120 rotates, the nozzle 108 deposits printing material over the build platform 120, thereby forming the layer 300a.

In an embodiment, while fabricating a layer that have some rounded sections and some sections that are not rounded, the fabrication can be achieved by a combination of the rotation of the build platform 120 and the movement of the nozzle 108 in the horizontal x-y plane. For example, FIG. 3B illustrates the layer 300b having a roughly rectangular shape, with two rounded corners a1 and a2, one sharp edged corner a3, and one corner a4 having an irregular shape. In an example, the two rounded corners a1 and a2 have centers at C1 and C2, respectively, and an arch that is at distances R1 and R2, respectively, from the respective centers C1 and C2 (e.g., if the two rounded corners are symmetrical, then R1 is equal to R2). In additional to the four corners, the layer 300b has four sides, one of which is marked as B1 in FIG. 3B.

In an embodiment, the four sides (e.g., including the side labeled as B1) and the corners a3 and a4 of the layer 300b are fabricated by driving the nozzle 108 over the build platform 120 in the x-y plane. For example, while the nozzle 108 is driven over the build platform 120 to fabricate the four sides and the corners a3 and a4 of the layer 300b, the build platform 120 is not rotated (i.e., the build platform 120 is not driven by the drive mechanism 124), and the nozzle 108 moves over the build platform in the horizontal plane to trace the four sides and the corners a3 and a4 of the layer 300b, while depositing printing material.

However, when the corners a1 and a2 are to be fabricated, the nozzle 108 is kept stationary, and the build platform 120 is rotated while the nozzle 108 deposits the printing material. For example, for fabricating the corner a1, the build platform 120 is rotated centering the point C1 (i.e., a pivot point of the rotation of the build platform 120 is aligned with the point C1), while the nozzle 108 is kept stationary at the distance R1 from the center point C1 of the corner a1 of the layer 300b. Similarly, while the corner a2 is being fabricated, the build platform 120 is rotated centering the point C2 (i.e., a pivot point of the rotation of the build platform 120 is aligned with the point C1), while the nozzle 108 is kept stationary at the distance R2 from the center point C2 of the corner a2 of the layer 300b.

Thus, while fabricating at least a first part of the layer 300b (e.g., while fabricating the sides and corners a3 and a4), the build platform 120 is not rotated (but may be moved vertically in the Z-axis direction, if needed), and the nozzle 108 moves in the x-y plane and deposits the printing material. That is, while fabricating at least the first part of the layer 300b, the system 100 (e.g., the nozzle 108 and the build platform 120) operates using the Cartesian coordinate system (i.e., utilizes movement of the nozzle 108 in the x-y plane and movement of the build platform 120 along the Z axis for fabrication of the 3D object).

Also, while fabricating at least a second part of the layer 300b (e.g., while fabricating the corners a1 and a2), the build platform 120 is rotated around a pivot point (e.g., rotated around the center point C1 while fabricating the corner a1), and the nozzle 108 is kept stationary at a specific distance from the center of rotation of the build platform 120 (e.g., the nozzle 108 is kept stationary at the distance R1 from the center point C1). That is, while fabricating at least the second part of the layer 300b, the system 100 (e.g., the nozzle 108 and the build platform 120) operates using the Cylindrical coordinate system.

Switching between the Cartesian coordinate system and the Cylindrical coordinate system by the system 100 is based on the layer that the system 100 is currently fabricating, as discussed herein above. Methods for moving the center points C1 and C2 while fabricating the curved sections of layer 300b are discussed in more detail later herein.

Figure 4A:
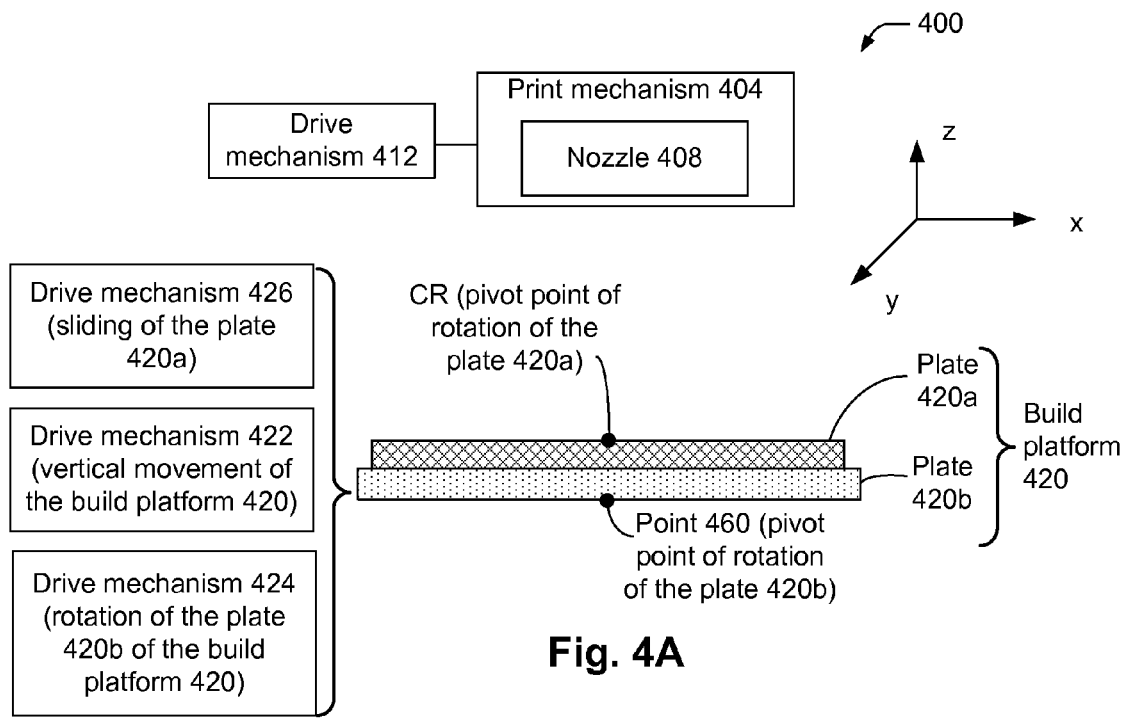
FIGS. 4A and 4B schematically illustrate a system for fabricating a 3D object from a digital representation of the object, where the system comprises (i) a build platform and (ii) a mechanism to selectively shift a pivot point or a center point of rotation of the build platform.
Figure 4B:
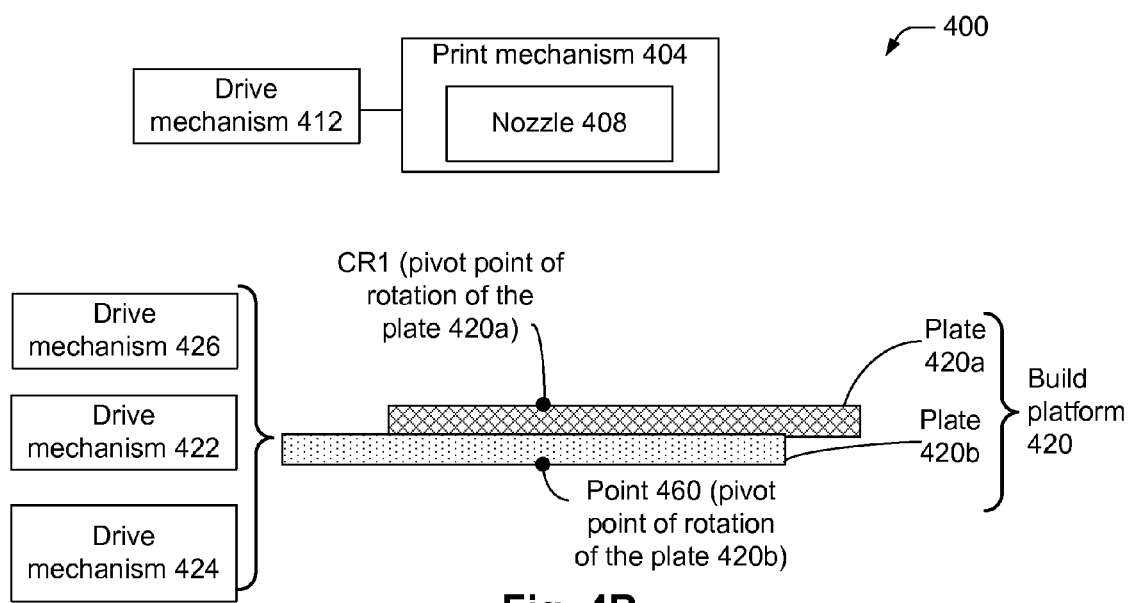

In FIG. 3B, the build platform 120 is rotated around the center point C1 while fabricating the corner a1, and is rotated around the center point C2 while fabricating the corner a2. That is, the center point of rotation of the build platform 120 (i.e., the pivot point associated with the rotation of the build platform 120) needs to be shifted, based on a location of the build platform 120 on which the rounded corner is to be fabricated. FIGS. 4A and 4B schematically illustrate a system 400 for fabricating a 3D object from a digital representation of the object, where the system 400 comprises (i) a build platform 420 and (ii) a mechanism to selectively shift a pivot point or a center point of rotation of the build platform 420.

The system 400 is to an extent similar to the system 100 of FIG. 1. For example, similar to the system 100 of FIG. 1, the system 400 comprises a print mechanism 404 disposed above the build platform 420. The print mechanism 404 comprises a nozzle 408. The system 400 further comprises a drive mechanism 412 configured to drive the nozzle 408 in the x-y plane, i.e., horizontally over the build platform 420, while the nozzle 408 deposits printing material on the build platform 420 while fabricating the 3D object.

The system 400 further comprises the build platform 420, on which the 3D object is fabricated, e.g., based on the nozzle 408 depositing the printing material on the build platform 420. In an embodiment, the system 400 further comprises a drive mechanism 422 (which, for example, is similar to the drive mechanism 122 of the system 100) configured to drive the build platform 420 in the direction of the Z-axis, i.e., drive the build platform 420 vertically, while the nozzle 408 deposits printing material on the build platform 420 while fabricating the 3D object.

In an embodiment, the build platform 420 comprises two plates or planes—a first plate 420a and a second plate 420b. The 3D object is fabricated on a top surface of the plate 420a. In an embodiment, the plates 420a and 420b are attached such that the plate 420a can slide over the plate 420b.

For example, the plates 420a and 420b are attached to each other using an appropriate mechanical arrangement (e.g., using a bearing arrangement) that allows the plate 420a to slide over the plate 420b. In an example, the plate 420b is stationary, i.e., there is no to linear or sliding movement of the plate 420b, and the plate 420a slides relative to the plate 420a. In an embodiment, a drive mechanism 426 slides the plate 420a over the plate 420b, and controls an amount of slide (e.g., such that the plate 420a is positioned at any desired position relative to the plate 420b, based on a layer of the 3D object being fabricated). In an embodiment, plates 420a and 420b moves in directions orthogonal to each other. For example, one of the plates 420a and 420b moves parallel to the X axis, while another of the plates 420a and 420b moves parallel to the Y axis.

In an embodiment, the system 400 further comprises a drive mechanism 424 configured to rotate the plate 420b of the build platform 420. In an example, the drive mechanism 424 is similar to the drive mechanism 124 of the system 100. In an embodiment, the plate 420b is rotated around a center point of the plate 420b, labeled in FIGS. 4A and 4B as point 460 (i.e., the point 460 forms the pivot point for the rotation of the plate 420b).

FIG. 4A illustrates a scenario where the plate 420a is slid over (e.g., using the drive mechanism 426) the plate 420b such that the plates 420a and 420b are concentric (i.e., a center point of the plate 420a substantially or somewhat aligns with a center point of the plate 420b). For example, a location CR of the plate 420a (which, for example, is also a center point of the plate 420a) is aligned with the point 460 in FIG. 4A. Thus, in FIG. 4A, when the plate 420b is rotated (e.g., using the drive mechanism 424), the plate 420a rotates around the point CR.

FIG. 4B illustrates a scenario where the plate 420a is slid over (e.g., using the drive mechanism 426) the plate 420b such that a location CR1 of the plate 420a aligns with the point 460 of the plate 420b. Thus, in FIG. 4B, when the plate 420b is rotated (e.g., using the drive mechanism 424) centering the point 460, the plate 420a rotates around the location CR1.

Thus, put differently, in FIG. 4A, the plate 420a is rotated centering the location CR; while in FIG. 4B, the plate 420a is rotated centering the location CR1. Thus, the center of rotation of the plate 420a (i.e., the pivot point of rotation of the plate 420a) is shifted by appropriately sliding the plate 420a over the plate 420b.

In an example, while forming the corner a1 of the layer 300b of FIG. 3B, the plate 420a can be rotated centering the location C1; and while forming the corner a2 of the layer 300b of FIG. 3B, the plate 420a can be rotated centering the location C2.

FIGS. 4A and 4B illustrate shifting a center point of rotation of a build platform using two plates of the build platform, and sliding a top plate over a bottom plate of the build platform. However, the center point of rotation of the build platform can be shifted using any other appropriate manner. For example, FIGS. 5A and 5B schematically illustrate a system 500 for fabricating a 3D object from a digital representation of the object, where the system 500 comprises (i) a build platform 520 and (ii) a mechanism to selectively shift a pivot point or a center point of rotation of the build platform 520 by selectively shifting a drive mechanism used to rotate the build platform 520.

Figure 5A:
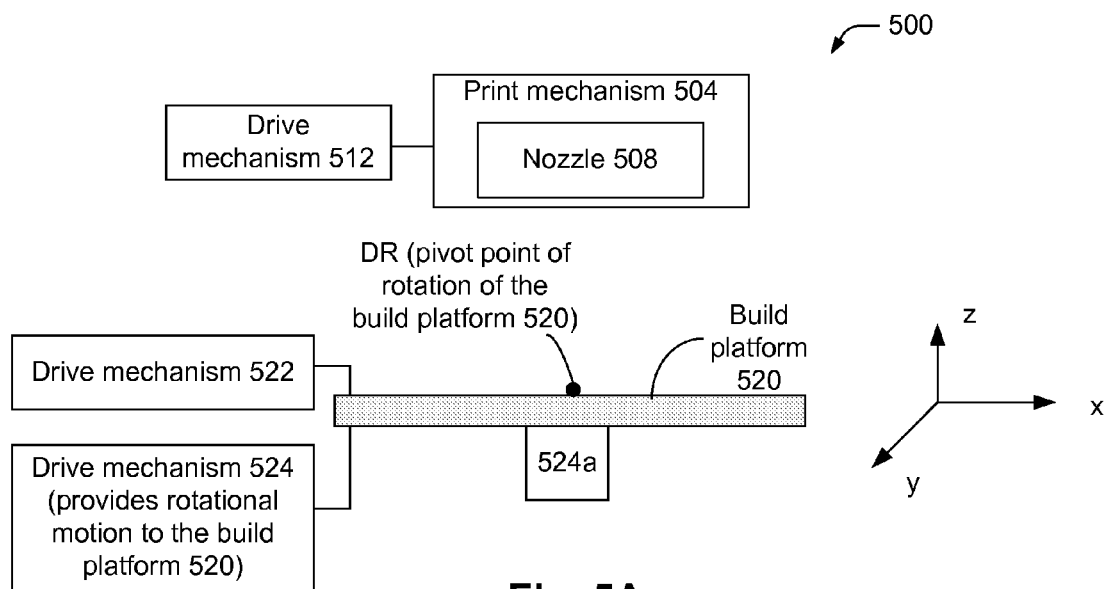
FIGS. 5A and 5B schematically illustrate a system for fabricating a 3D object from a digital representation of the object, where the system comprises (i) a build platform and (ii) a mechanism to selectively shift a pivot point or a center point of rotation of the build platform by selectively shifting a drive mechanism used to rotate the build platform.
Figure 5B:
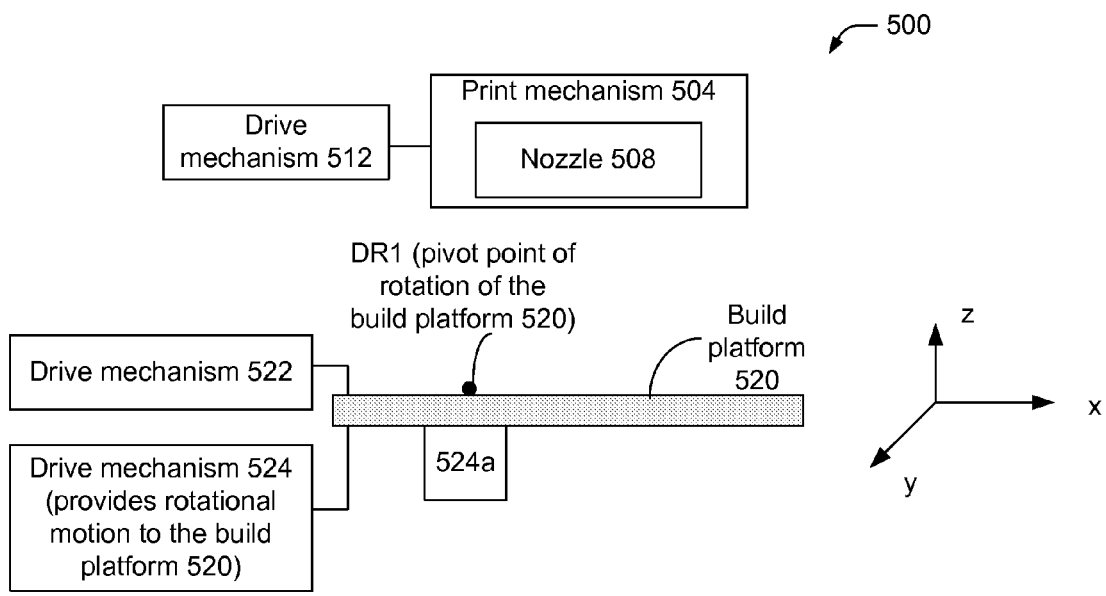

The system 500 of FIGS. 5A and 5B is to an extent similar to the system 100 of FIG. 1. For example, similar to the system 100 of FIG. 1, the system 500 comprises a print mechanism 504 disposed above the build platform 520. The print mechanism 504 comprises a nozzle 508. The system 500 further comprises a drive mechanism 512 configured to drive the nozzle 508 in the x-y plane, i.e., horizontally over the build platform 520, while the nozzle 508 deposits printing material on the build platform 520 while fabricating the 3D object.

The system 500 further comprises the build platform 520, on which the 3D object is fabricated, e.g., based on the nozzle 508 depositing the printing material on the build platform 520. In an embodiment, the system 500 further comprises a drive mechanism 522 (which, for example, is similar to the drive mechanism 522 of the system 100) configured to drive the build platform 520 in the direction of the Z-axis, i.e., drive the build platform 520 vertically, while the nozzle 508 deposits printing material on the build platform 520 while fabricating the 3D object.

In an embodiment, the system 500 further comprises a drive mechanism 524 configured to rotate the build platform 520. In an example, the drive mechanism 524 comprises an arrangement 524a to rotate the build platform 520. Although FIGS. 5A and 5B illustrate the arrangement 524a to be external to the drive mechanism 524 for purposes of illustrative clarity, the arrangement 524a can be included in the drive mechanism 524.

In an example, the arrangement 524a comprises a rotating shaft (or other appropriate arrangements, such as a gear), which translates a motion of the drive mechanism 524 to a rotational motion of the build platform 520.

In an embodiment, the arrangement 524a is attached to a bottom section or a bottom surface of the build platform 520. In an embodiment, the arrangement 524a can be shifted relative to the bottom surface of the build platform 520. For example, FIG. 5A illustrate the arrangement 524a being positioned at about a center point of the build platform 120 (e.g., positioned at a location labeled as DR in FIG. 5A). Also, for example, FIG. 5B illustrate the arrangement 524a being positioned off-center of the build platform 120 (e.g., positioned at a location labeled as DR1 in FIG. 5B).

Shifting the arrangement 524a relative to the bottom surface of the build platform 520 can be achieved using any appropriate mechanical arrangement used for such purposes. In an example, the bottom surface of the build platform 520 has multiple slots or gear arrangements, using which the arrangement 524a is shifted relative to the bottom surface of the build platform 520.

Shifting the arrangement 524a relative to the bottom surface of the build platform 520 also shifts the center point of rotation of the build platform 520. For example, in FIG. 5A, the build platform 520 rotates around the location DR; while in FIG. 5B, the build platform 520 rotates around the location DR1.

In an example, while forming the corner a1 of the layer 300b of FIG. 3B, the build platform 520 is rotated centering the location C1 (i.e., the location C1 of FIG. 3B is aligned with the location DR of FIG. 5A); and while forming the corner a2 of the layer 300b of FIG. 3B, the build platform 520 is rotated centering the location C2 (i.e., the location C2 of FIG. 3B is aligned with the location DR1 of FIG. 5B).

Although not illustrated in the figures, in an embodiment, the system 100 (and/or the systems 400 and 500) includes a sensor to monitor an angular rotation of the build platform 120. For example, an optical sensor is used to detect a slot in a rim of the build platform 120 to denote a home or zero degree position of the build platform 120, and a number of steps of rotation of a stepper motor (which, for example, facilitates a rotation of the build platform 120) is counted to determine the angle of rotation of the build platform 120. In another embodiment, the build platform 120 (e.g., a bottom surface or a side surface of the build platform 120) has bar codes encoded, and an optical encoder senses the bar codes to determine an angular position of the build platform 120. Any other appropriate arrangement can be envisioned by those skilled in the art, based on the teachings of this disclosure, to monitor an angular position of the build platform 120. For example, a plurality of magnets embedded within the build platform 120 and a hall-effect sensor can be used to determine an angular position of the build platform 120.

Referring again to FIG. 1, in an embodiment, while the build platform 120 is rotating around a center point, an absolute location of the nozzle 108 is not relevant, as long as the nozzle 108 is at a specific distance from the center of rotation of the build platform 120. For example, while the circular layer 300a of FIG. 3A is being fabricated, the nozzle 108 can be located at any point along the circumference of the circle.

In an embodiment, the location of the nozzle 108 may be moved at the same time that the build platform 120 is being rotated, to fabricate a non-circular arc, an elliptical shape or other arbitrary path. For example, while a first section of a first layer of the 3D object is being fabricated, the build platform is rotated simultaneously with driving the nozzle over the build platform. The first section of the first layer of the 3D object, for example, represents a non-circular arc, an elliptical shape or other arbitrary path.

In an embodiment and although not illustrated in the figures, the rotation of the build platform 120 can be used to fabricate all the layers of the 3D object. For example, in addition to fabricating the corners a1 and a2, the rotation of the build platform 120 can also be used to fabricate the sides and the corners of the layer 300b of FIG. 3B. In such an embodiment, while, for example, a straight line is fabricated (e.g., while the side B1 is fabricated), the center of rotation of the build platform 120 is continually adjusted and the position of the nozzle 108 is also continually adjusted, thereby fabricating the straight line (or layers of any other shapes). In such an embodiment, the nozzle 108 need not be able to move both in x and y directions, and the drive mechanism 112 can be used to drive the nozzle 108 in only one of the x direction or the y direction. Thus, such an embodiment results in the drive mechanism 112 being simpler, as the drive mechanism 112 is designed to move the nozzle 108, for example, in only x direction.

Figure 6:
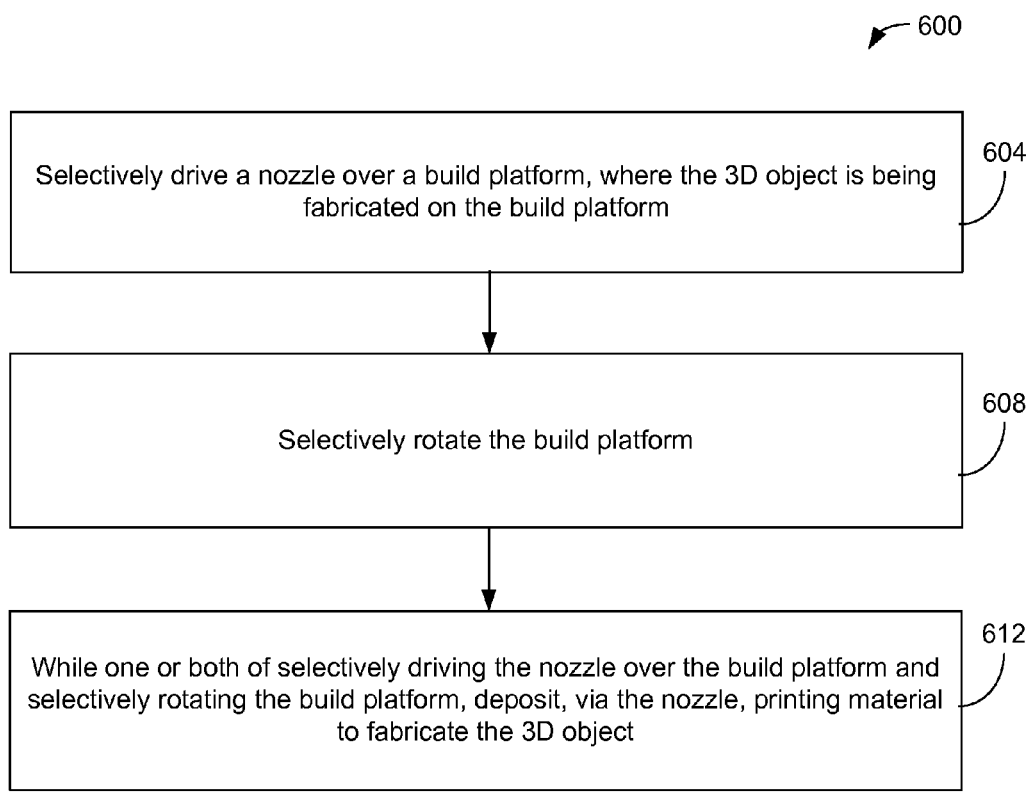
FIG. 6 is a flow diagram of an example method for fabricating a 3D object using selective rotation of a build platform.

FIG. 6 is a flow diagram of an example method 600 for fabricating a 3D object using selective rotation of a build platform. The method 600 is implemented, for example, using one or more of the systems 100, 400 and 500 of FIGS. 1-5B (or a similar 3D printing system).

At 604, a nozzle (e.g., nozzle 108 of the system 100) is selectively driven over a build platform (e.g., build platform 120), where the 3D object is being fabricated on the build platform. At 608, the build platform is selectively rotated. At 612, while one or both of selectively driving the nozzle over the build platform and selectively rotating the build platform, printing material is deposited via the nozzle to fabricate the 3D object.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus for fabricating a three-dimensional (3D) object from a digital representation of the 3D object stored in a computer readable media, the apparatus comprising:
 a build platform on which the 3D object is to be fabricated;

a nozzle configured to deposit printing material on the build platform to fabricate the 3D object;

a first drive mechanism configured to drive the nozzle over the build platform;

a second drive mechanism configured to rotate the build platform; and an arrangement configured to selectively shift a center of rotation of the build platform, based on a layer of the 3D object being fabricated.

2. The apparatus of claim 1, wherein:

while a first section of a first layer of the 3D object is being fabricated, the second drive mechanism is further configured to rotate the build platform; and while the first section of the first layer of the 3D object is being fabricated, the first drive mechanism is further configured not to drive the nozzle over the build platform.

3. The apparatus of claim 2, wherein:

the first section of the first layer of the 3D object has a circular or a rounded shape;

the circular or the rounded shape has a center and a radius;

while the first section of the first layer of the 3D object is being fabricated, the second drive mechanism is further configured to rotate the build platform with a pivot point that aligns with the center of the circular or the rounded shape of the first section of the first layer of the 3D object; and while the first section of the first layer of the 3D object is being fabricated, the first drive mechanism is further configured to position the nozzle at a first distance from the center of the circular or the rounded shape of the first section of the first layer of the 3D object, wherein the first distance is substantially equal to the radius of the circular or the rounded shape of the first section of the first layer of the 3D object.

4. The apparatus of claim 2, wherein:

while a second section of the first layer of the 3D object is being fabricated, the first drive mechanism is further configured to drive the nozzle over the build platform, wherein the second section of the first layer of the 3D object does not have a circular shape; and while the second section of the first layer of the 3D object is being fabricated, the second drive mechanism is further configured to not to rotate the build platform.

5. The apparatus of claim 1, wherein:

the build platform comprises a first plate and a second plate; and the arrangement is configured to selectively slide the first plate of the build platform over the second plate of the build platform, thereby shifting the center of rotation of the build platform.

6. The apparatus of claim 1, wherein:

the arrangement is configured to rotate the build platform; and the arrangement is configured to slide with respect to the build platform, thereby shifting the center of rotation of the build platform.

7. The apparatus of claim 1, further comprising:

a third drive mechanism configured to drive the build platform in a direction that is perpendicular to a plane of the build platform.

8. The apparatus of claim 1, further comprising:

a sensor configured to sense an angular position of the build platform.

9. The apparatus of claim 1, wherein:

the second drive mechanism comprises one of (i) a gear arrangement or (ii) a roller in mechanical contact with a side surface on an outer diameter of the build platform.

* * * * *